United States Patent Office 3,527,626
Patented Sept. 8, 1970

3,527,626
SILICON CARBIDE LUMINESCENT MATERIALS
Robert William Brander, Pinner, England, assignor to The General Electric and English Electric Companies Limited, London, England, a British company
No Drawing. Filed Sept. 7, 1967, Ser. No. 665,990
Claims priority, application Great Britain, Sept. 19, 1966, 41,812/66
Int. Cl. C09k *1/50;* H01l *3/00*
U.S. Cl. 148—33.4     5 Claims

ABSTRACT OF THE DISCLOSURE

Luminescent materials consist of n-type silicon carbide containing oxygen and one or more Group III–A acceptor impurities in addition to one or more donor impurities, a preferred material containing nitrogen, oxygen and boron as the significant impurities. Single crystals of the materials can be produced by liquid phase or vapour phase epitaxial growth upon a silicon carbide crystal substrate, and luminescent powder by crushing the crystals so formed, by crushing material deposited from a vapour phase reaction mixture upon a refractory body, or by diffusion of the desired impurities into silicon carbide powder. The materials may have applications in electroluminescent light sources, electric discharge lamps and cathode ray tubes.

---

This invention relates to luminescent materials composed mainly of silicon carbide, to the manufacture of such materials, and to electrical devices including such materials.

It is known that silicon carbide possesses both electroluminescent and photoluminescent properties, and it has been shown that the luminescent properties of silicon carbide can be modified, and in some cases enhanced, by the incorporation therein of minor proportions of certain additional elements. For example, it has been proposed to produce materials excitable to luminescence by ultraviolet radiation of wavelength 3650 A., by incorporating one of the acceptor elements, boron, aluminium, gallium or indium, in silicon carbide in conjunction with a donor element such as nitrogen (the terms "donor" and "acceptor" as used herein are to be understood to have their usual meanings as applied to significant impurities incorporated in semiconductor materials such as silicon carbide, donor impurities and acceptor impurities being employed respectively for imparting n-type and p-type conductivity to the semiconductor materials).

It is an object of the present invention to provide novel luminescent materials of the kind consisting of silicon carbide with additive elements, which materials are excitable to luminescence by at least one of the usual exciting agencies consisting of ultraviolet radiation, cathode rays, X-rays, and an applied voltage.

The invention also includes within its scope electrical devices, for example electroluminescent light sources, mercury vapour electric discharge lamps, cathode ray tubes, and X-ray screens, which incorporate one or more of the luminescent materials in accordance with the invention, arranged so as to be excited to luminescence during the operation of the device.

According to the invention a luminescent material consists of silicon carbide of n-type conductivity and containing, as significant impurities, at least one element constituting a donor impurity, oxygen, and at least one acceptor impurity consisting of an element of Group III–A of the Periodic Table of the elements, the total atomic proportion of the said acceptor element or elements present being smaller than the total atomic proportion of the said donor element or elements present, and the said impurities being such that the material is excitable to luminescence by at least one of the aforesaid exciting agencies.

The donor impurities incorporated in the materials of the invention may be any of the elements which are known to impart n-type conductivity to silicon carbide, but the preferred donor impurities are the elements of Group V–A of the Periodic Table of the elements, namely nitrogen, phosphorus, arsenic, antimony, bismuth, and we have found that nitrogen and phosphorus are particularly suitable.

The acceptor impurity may be any element of Group III–A of the Periodic Table, especially boron, aluminium, gallium or indium. The amount of the Group III–A element or elements employed must be only sufficient for partial charge compensation, that is to say the total atomic proportion of the Group III–A elements or elements must be smaller than the total atomic proportion of the donor element or elements, to ensure that the overall n-type conductivity of the material is maintained. The oxygen present does not appreciably affect the conductivity of the material; however, it is believed that oxygen is capable of functioning as a deep donor, that is to say a donor whose activation energy is significantly greater than the thermal energy of the silicon carbide lattice. The inclusion of oxygen in the materials of the invention is advantageous in that it results in an increase in the brightness of the luminescence, in comparison with that shown by the known silicon carbide luminescent materials containing only Group III–A elements in addition to donor impurities.

In a preferred silicon carbide luminescent material in accordance with the invention, the incorporated impurities consist of nitrogen, oxygen and boron, the proportion of each said impurity present suitably being in the range of $10^{17}$ to $10^{20}$ atoms per cubic centimetre of silicon carbide, and preferably in the range of $10^{18}$ to $10^{19}$ atoms per cubic centimetre, but the atomic proportion of boron being less than the atomic proportion of nitrogen as aforesaid. Apart from the deliberately added impurities, the silicon carbide employed in the manufacture of the luminescent materials should, of course, be of the highest degree of purity obtainable, in order to ensure that the luminescent properties of the materials can be accurately controlled.

The luminescent materials of the invention may be in the form of single crystals of silicon carbide containing the appropriate impurities, or in the form of a crystalline powder, depending upon the application for which the materials is to be employed.

The materials are electroluminescent: thus they are excited to luminescence by positive hole injection across a p-n junction as a result of forward bias across the junction under the application of an alternating current or direct current voltage. Hence for the provision of an electroluminescent light source, a single crystal of silicon carbide incorporating a p-n junction is employed, the n-type portion of the crystal including oxygen and at least one Group III–A acceptor impurity, in addition to a donor impurity, in accordance with the invention.

The materials of the invention are also excitable to luminescence by ultraviolet radiation, especially radiation of wavelength 3650 A., and by cathode rays. For applications employing these exciting agencies it is not necessary for a p-n junction to be present, and therefore the material may be in the form of either n-type single crystals or a n-type crystalline powder, as desired.

The colour of luminescence exhibited by these materials varies with silicon carbide crystals of different polytypes, and also with different Group III–A impurities incorporated in the silicon carbide. For example, crystals containing nitrogen, oxygen and boron exhibit luminescence of red-orange, yellow, greenish yellow, green and blue colours respectively when they are of 21R rhombohedral, 15R rhombohedral, 6H hexagonal, 4H hexagonal, and 2H hexagonal polytypes respectively. In some cases, for example with crystals of cubic polytype, some emission by the infrared region of the spectrum, as well as in the visible red region, is obtained.

The luminescent materials of the invention can be manufactured by any suitable method by which desired impurities can be introduced into silicon carbide in single crystal or powder form. Luminescent single crystals are preferably produced by epitaxial growth upon silicon carbide crystal substrates, either from a liquid phase comprising a solution of silicon carbide in molten silicon or from a vapour phase reaction mixture.

A liquid phase epitaxial growth process may be carried out by introducing carbon and the desired impurity elements, in the required proportions, into molten silicon, the carbon combining with silicon to form silicon carbide which dissolves in the molten silicon, and causing the melt to come into contact with a crystal substrate at a temperature such that silicon carbide containing the impurity elements is deposited from the melt upon the substrate. The temperature must of course be sufficiently high to ensure that the silicon remains molten throughout the process, that is to say above about 1450° C. One suitable method of carrying out this process comprises melting silicon in a graphite crucible in which a substrate crystal of silicon carbide is supported, and establishing a temperature gradient within the crucible such that silicon carbide, formed by combination of part of the molten silicon with graphite from the crucible wall, is deposited as an epitaxial layer upon the substrate, the impurities which it is desired to incorporate in the crystal being introduced into the molten silicon and deposited from the melt with the silicon carbide.

In a liquid phase epitaxial growth process, nitrogen is preferably introduced as the donor impurity; difficulties may be encountered in attempting to introduce any other Group V-A impurity in elemental form by this method, although these elements may be introduced in the form of vapours of suitable compounds. For example, for producing a luminescent silicon carbide crystal in accordance with the invention, oxygen can be introduced into the melt in the form of powdered silica, boron or other Group III-A element may be introduced either by adding the powdered element to the melt or by initially using silicon in which an appropriate proportion of the required element has already been incorporated, and nitrogen is conveniently introduced by carrying out the melting and deposition process in the presence of nitrogen gas. If it is desired to produce a crystal including a p-n junction, a substrate composed of p-type silicon carbide is used.

In an alternative method of producing a luminescent silicon carbide crystal in accordance with the invention, an epitaxial layer of silicon carbide containing the required impurities is deposited upon a substrate consisting of either p-type or n-type silicon carbide, as desired, from a reaction mixture of gases and/or vapours consisting of or including suitable compounds of silicon and of carbon, and the said impurities or compounds thereof. For example, for the production of a crystal of silicon carbide containing nitrogen, oxygen and boron, a substrate crystal of silicon carbide (p-type if a p-n junction is required in the final crystal) is heated to a temperature in the range of 1450° C. or 2000° C., suitably by radio frequency induction heating, in the presence of a vapour phase mixture consisting of hydrogen, nitrogen, a silicon compound such as trichlorosilane, a hydrocarbon such as hexane or benzene, a boron compound such as diborane, and oxygen or a suitable oxygen-containing compound, for example water vapour, an ether or a ketone. The reaction of this mixture results in the formation of silicon carbide in which nitrogen, oxygen and boron are incorporated in proportions controlled by the relative proportions of the constituents of the gaseous mixture, and this material is deposited in crystalline form as an epitaxial layer upon the substrate.

If it is desired to obtain silicon carbide luminescent material in powder form, crystals may be prepared by one of the methods described above and subsequently ground to powder. Alternatively the desired impurity elements may be introduced into silicon carbide powder by diffusion. In another, and preferred, method of making the luminescent powder, a vapour phase reaction similar to that described above can be arranged to take place at a surface of a body of refractory material which is non-reactive with the gas/vapour mixture, for example graphite, tungsten or molybdenum, which body thus forms a substrate on which silicon carbide containing the desired impurity elements is deposited, the material deposited on the refractory body being subsequently removed and crushed to powder.

The apparatus used for the process of the example comprised a graphite crucible within which were located graphite clamps arranged to hold substrate crystals at an angle of 40° to the horizontal, and a graphite disc, supported on a central graphite rod, for initially carrying pieces of silicon and other solid starting materials. The crucible was closed by a graphite cap and was supported within a heating arrangement comprising graphite heating elements enclosed within a water-cooled, vacuum-tight, metal bell jar.

For producing luminescent crystals including p-n junctions, using the apparatus described above, substrate crystals of p-type silicon carbide were placed in the graphite clamps within the crucible, and 40 grams of high purity silicon, in lump form, were placed on the graphite disc together with 100 milligrams of boron powder and 200 milligrams of silica powder. Nitrogen was introduced into the atmosphere within the crucible, which was then closed and mounted in the heating element assembly within the bell jar. The bell jar was evacuated, and the crucible was heated to 1650° C. and was maintained at this temperature for the requisite length of time for achieving the deposition of an epitaxial layer of the desired thickness on the substrate crystals, a suitable length of time being from 2 to 5 hours. The concentration of nitrogen in the crucible atmosphere was arranged to be sufficient to give a nitrogen content of about $2 \times 10$ atoms per cubic centimetre of the deposited silicon carbide, and the quantities of silica and boron employed, as indicated above, were sufficient to result in the introduction of proportions of oxygen and boron each of the order of $1 \times 10^{18}$ atoms per cc. into the deposited silicon carbide.

The crystals produced by the process described in the example were found, on the application of a D.C. voltage of 4 to 5 volts across the junctions to give a bright yellow luminescence.

In a modification of the process of the example, for the production of crystals not including p-n junctions, the substrate crystals employed consisted of n-type silicon carbide. The crystals so produced were excitable to luminescence of a bright yellow colour by 3650 A. ultra-violet radiation and by cathode rays.

The luminescent materials of the invention are suitable, when in the form of single crystals incorporating p-n junctions, for use as electroluminescent light sources: for this purpose the crystals are provided with fused contacts consisting of metal films applied to the surfaces of the crystal, suitable films consisting of a gold-tantalium alloy for the n-type portion of the crystal and a gold-tantalum-aluminum alloy for the p-type portion. In one practical application a plurality of such crystals, which may be about 0.5 mm. square, can be mounted to form an array of light sources for use in a digital display. The crystals can also be used in integrated arrangements, either singly or in arrays, and for marking photographic films in such a manner that coded information can be recorded by energising the light sources.

Furthermore, since the luminescent materials of the invention are excitable to luminescence by 3650 A. ultraviolet radiation and by cathode rays, it will be apparent that the materials, especially in powder form, may have applications in high pressure mercury vapour electric discharge lamps and in cathode ray tubes.

I claim:

1. A luminescent material which consists of silicon carbide of n-type conductivity and containing, as significant impurities, at least one donor impurity consisting of an element selected from the group consisting of nitrogen, phosphorus, arsenic, antimony and bismuth, at least one acceptor impurity consisting of an element which is a member of the group consisting of boron, aluminum, gallium, indium, and thallium, and oxygen in a proportion in the range of $10^{17}$ to $10^{20}$ atoms per cubic centimetre of silicon carbine, the total atomic proportion of the said acceptor elements being smaller than the total atomic proportion of the said donor elements, and the said impurities being such that the material is excitable to luminescence by ultraviolet radiation.

2. A luminescent material according to claim 1, wherein the impurities incorporated in the silicon carbide consist of nitrogen, oxygen and boron, each in a proportion in the range of $10^{17}$ to $10^{20}$ atoms per cubic centimetre of silicon carbide, the atomic proportion of boron present being smaller than the atomic proportion of nitrogen present.

3. A luminescent material according to claim 2, wherein the proportions of nitrogen, oxygen and boron are each in the range of $10^{18}$ to $10^{19}$ atoms per cubic centimetre of silicon carbide.

4. A luminescent single crystal consisting of a silicon carbide crystal substrate having formed upon it an epitaxial layer of a luminescent material according to claim 1.

5. A luminescent single crystal according to claim 4, wherein the said substrate consists of a crystal of p-type silicon carbide for establishing a p-n junction within the crystal, whereby the crystal is rendered excitable to luminescence by positive pole injection across the junction resulting from the application of a voltage across the junction.

References Cited

UNITED STATES PATENTS

| 3,236,780 | 2/1966 | Ozarow | 252—301.4 |
| 3,361,678 | 1/1968 | Addamiano | 252—301.4 |

FOREIGN PATENTS

| 732,784 | 4/1966 | Canada. |

TOBIAS E. LEVOW, Primary Examiner

J. COOPER, Assistant Examiner

U.S. Cl. X.R.

252—62.3, 301.4, 516